US006677280B2

(12) United States Patent
Küpper et al.

(10) Patent No.: US 6,677,280 B2
(45) Date of Patent: Jan. 13, 2004

(54) TRANSPORT OF CONTAINERS ON CONVEYORS

(75) Inventors: Stefan Küpper, Langenfeld (DE); Michael Schneider, Juchen (DE); Walter Grosse Böwing, Dormagen (DE); Alfred Laufenberg, Dormagen (DE); Harald Kluschanzoff, Mettmann (DE)

(73) Assignee: Ecolab GmbH & Co. OHG, Dusseldorf (DE)

( * ) Notice: Subject to any disclaimer, the term of this patent is extended or adjusted under 35 U.S.C. 154(b) by 0 days.

(21) Appl. No.: 09/731,118

(22) Filed: Dec. 6, 2000

(65) Prior Publication Data

US 2001/0003733 A1 Jun. 14, 2001

(30) Foreign Application Priority Data

Dec. 9, 1999 (DE) .......................................... 199 59 315

(51) Int. Cl.$^7$ ..................... C10M 173/00; C10M 173/02
(52) U.S. Cl. ..................... 508/181; 508/208; 508/283; 508/433; 508/545; 508/562; 508/583; 508/590
(58) Field of Search .................................. 508/181, 208

(56) References Cited

U.S. PATENT DOCUMENTS

| 3,860,521 A | | 1/1975 | Aepli et al. .................. 508/438 |
| 4,769,162 A | * | 9/1988 | Remus ......................... 252/18 |
| 4,839,067 A | | 6/1989 | Jansen ......................... 508/527 |
| 5,391,308 A | * | 2/1995 | Despo ....................... 252/32.5 |
| 5,510,045 A | * | 4/1996 | Remus ....................... 252/49.3 |
| 5,663,131 A | * | 9/1997 | Winicov et al. ............. 508/580 |
| 5,873,946 A | * | 2/1999 | Hantmann .................... 134/15 |
| 5,925,601 A | * | 7/1999 | McSherry et al. ........... 508/425 |
| 6,207,622 B1 | | 3/2001 | Li et al. ..................... 508/208 |
| 6,214,777 B1 | * | 4/2001 | Li et al. ..................... 508/388 |
| 6,288,012 B1 | * | 9/2001 | Li et al. ..................... 508/113 |

FOREIGN PATENT DOCUMENTS

| DE | 2 313 330 | 3/1973 |
| DE | 36 31 953 | 9/1986 |
| DE | 39 05 548 | 2/1989 |
| DE | 42 06 506 | 3/1992 |
| EP | 0 629 234 | 2/1993 |
| EP | 0 372 628 | 5/1993 |
| WO | WO 94/03562 | 2/1994 |

OTHER PUBLICATIONS

*Guidelines for an Industrial Code of Practice for Refillable PET Bottles, Edition 1.* UNESDA–CESDA, 1993–1994.

* cited by examiner

*Primary Examiner*—Ellen M. McAvoy
(74) *Attorney, Agent, or Firm*—Merchant & Gould P.C.

(57) ABSTRACT

The invention relates to process for reducing the friction between new and/or freshly washed transport containers and conveyors, in which a composition containing at least one component with lubricating properties is applied to at least part of the surface of the container before it is placed on the conveyor, to containers of which at least part of the outer surface is finished with a film or a coating which contains lubricating components to reduce friction during transport on conveyors and to installations which are intended, and may advantageously be designed, for the transport of such containers.

20 Claims, No Drawings

TRANSPORT OF CONTAINERS ON CONVEYORS

This invention relates to a process for reducing the friction between new and/or freshly washed transport containers and conveyors, to containers which are provided on at least part of their outer surface with a film or coating containing lubricating components and to conveyors designed for the transport of such containers.

In the food industry and especially in beverage factories, the containers to be filled in the bottling plants are conveyed by conveyors differing in design and constituent materials, for example by platform conveyors or chain-like arrangements which are generally referred to hereinafter as chain conveyors. The conveyors establish the connection between the various optional treatment stages of the bottling process such as, for example, the unpacker, bottle washer, filler, closer, labeller, packer, etc. The containers may assume various forms, more particularly glass and plastic bottles, cans, glasses, casks, beverage containers (kegs), paper and paperboard containers. To guarantee uninterrupted operation, the conveyor chains have to be suitably lubricated to avoid excessive friction with the containers. Dilute aqueous solutions containing suitable friction-reducing ingredients are normally used for lubrication. The chain conveyors are contacted with the aqueous solutions by dipping or spraying, for example, the corresponding lubrication systems being known as dip lubrication or automatic belt lubrication or central chain lubrication systems.

The chain lubricants hitherto used as lubricants are mostly based on fatty acids in the form of their water-soluble alkali metal or alkanolamine salts or on fatty amines, preferably in the form of their organic or inorganic salts.

Whereas both classes of substances can be used without difficulty in dip lubrication, they are attended by a number of disadvantages in the central chain lubrication systems typically in use today. Thus, DE-A-23 13 330 describes soap-based lubricants containing aqueous mixtures of $C_{16-18}$ fatty acid salts and surface-active substances. Soap-based lubricants such as these have the following disadvantages:
1. They react with the hardness ions in water, i.e. the alkaline earth metal ions, and other ingredients of water to form poorly soluble metal soaps, so-called primary alkaline earth metal soaps.
2. A reaction takes place between the soap-based lubricants and carbon dioxide dissolved in water or in the product to be bottled.
3. The in-use solution thus prepared is always germ-promoting.
4. Where hard water is used, ion exchangers have to be employed to soften the water which means an additional source of germs (and is therefore hardly encountered in practice) or, alternatively, products of high complexing agent content have to be used which is ecologically unsafe.
5. Increased foaming occurs which can cause problems in particular at the bottle inspector (automatic bottle control) and results in greater wetting of the transport containers.
6. Most of these products contain solvents.
7. The cleaning effect of the products is poor so that separate cleaning is necessary.
8. Corresponding soap-based lubricant preparations show pH-dependent performance.
9. In addition, soap-based lubricant preparations are dependent on the water temperature.
10. Soap-based lubricants show poor stability in storage, particularly at low temperatures.
11. The EDTA (ethylenediamine tetraacetate) present in many products is known to have poor biodegradability.
12. Soap-based lubricant preparations are not suitable for all plastic transport containers because, in many cases, they give rise to stress cracking in the transport container.

Besides soap-based lubricants, lubricants based on fatty amines are mainly used. Thus, DE-A-36 31 953 describes a process for lubricating chain-type bottle conveyors in bottling factories, more particularly in breweries, and for cleaning the conveyors with a liquid cleaning composition, characterized in that the chain-type bottle conveyors are lubricated with belt lubricants based on neutralized primary fatty amines which preferably contain 12 to 18 carbon atoms and which have an unsaturated component of more than 10%.

EP-A-0 372 628 discloses fatty amine derivatives corresponding to the following formulae:

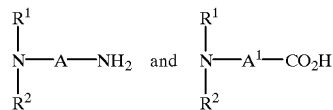

in which
$R^1$ is a saturated or unsaturated, branched or linear alkyl group containing 8 to 22 carbon atoms,
$R^2$ is hydrogen, an alkyl or hydroxyalkyl group containing 1 to 4 carbon atoms or —A—$NH_2$,
A is a linear or branched alkylene group containing 1 to 8 carbon atoms and
$A^1$ is a linear or branched alkylene group containing 2 to 4 carbon atoms, as lubricants.

In addition, lubricants based on N-alkylated fatty amine derivatives which contain at least one secondary and/or tertiary amine are known from DE-A-39 05 548.

DE-A-42 06 506 relates to soapless lubricants based on amphoteric compounds, primary, secondary and/or tertiary amines and/or salts of such amines corresponding to general formulae (I), (IIa), (IIb), (IIIa), (IIIb), (IIIc), (IVa) and (IVb):

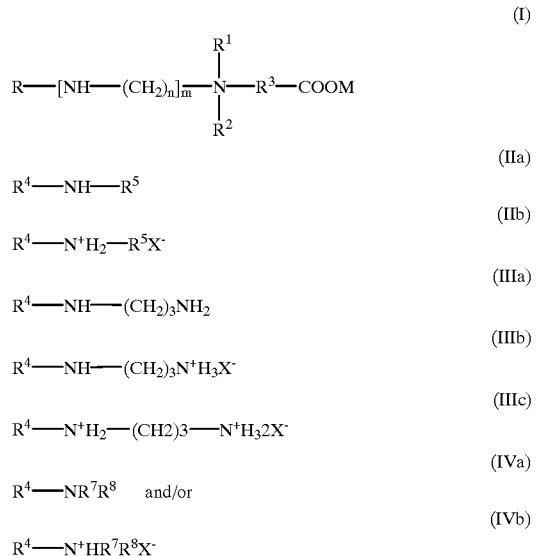

in which
R is a saturated or mono- or polyunsaturated, linear or branched alkyl group containing 6 to 22 carbon atoms which may optionally be substituted by —OH, —$NH_2$, —NH—, —CO—, —(CH$_2$CH$_2$O)$_1$— or —(CH$_2$CH$_2$CH$_2$O)$_1$—, R$^1$ is hydrogen, an alkyl group containing 1 to 4 carbon atoms, a hydroxyalkyl group containing 1 to 4 carbon atoms or a group —R$^3$COOM, R$^2$ is hydrogen, an alkyl group containing 1 to 4 carbon atoms or a hydroxyalkyl group containing 1 to 4 carbon atoms, but only where M represents a negative charge, R$^3$ is a saturated or mono- or polyunsaturated, linear or branched alkyl group containing 1 to 12 carbon atoms which may optionally be substituted by —OH, —NH$_2$, —NH—, —CO—, —(CH$_2$CH$_2$O)$_1$— or —(CH$_2$CH$_2$CH$_2$O)$_1$—, R$^4$ is a substituted or unsubstituted, linear or branched, saturated or mono- or polyunsaturated alkyl group containing 6 to 22 carbon atoms which may contain at least one amine, imine, hydroxy, halogen and/or carboxy group as substituent, a substituted or unsubstituted phenyl group which may contain at least one amine, imine, hydroxy, halogen, carboxy and/or a linear or branched, saturated or mono- or polyunsaturated alkyl group containing 6 to 22 carbon atoms as substituent, R$^5$ is hydrogen or—independently of R$^4$—has the same meaning as R$^4$, X$^-$ is an anion from the group consisting of amidosulfonate, nitrate, halide, sulfate, hydrogen carbonate, carbonate, phosphate or R$^6$—COO$^-$ where R$^6$ is hydrogen, a substituted or unsubstituted, linear or branched alkyl group containing 1 to 20 carbon atoms or alkenyl group containing 2 to 20 carbon atoms, which may contain at least one hydroxy, amine or imine group as substituent, or a substituted or unsubstituted phenyl group which may contain an alkyl group with 1 to 20 carbon atoms as substituent, and R$^7$ and R$^8$ independently of one another represent a substituted or unsubstituted, linear or branched alkyl group containing 1 to 20 carbon atoms or alkenyl group containing 2 to 20 carbon atoms which may contain at least one hydroxy, amine or imine group as substituent, or a substituted or unsubstituted phenyl group which may contain an alkyl group with 1 to 20 carbon atoms as substituent, M is hydrogen, alkali metal, ammonium, an alkyl group containing 1 to 4 carbon atoms, a benzyl group or a negative charge, n is an integer of 1 to 12, m is an integer of 0 to 5 and l is a number of 0 to 5, containing alkyl dimethylamine oxides and/or alkyl oligoglycosides as nonionic surfactants.

EP-B-629 234 discloses a lubricant combination consisting of a) one or more compounds corresponding to the following formula:

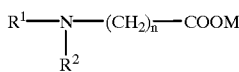

in which

R$^1$ is a saturated or mono- or polyunsaturated, linear or branched alkyl group containing 6 to 22 carbon atoms which may optionally be substituted by —OH, —NH$_2$—, —NH—, —CO—, halogen or a carboxyl group, R$^2$ is a carboxyl group containing 2 to 7 carbon atoms, M is hydrogen, alkali metal, ammonium, an alkyl group containing 1 to 4 carbon atoms or a benzyl group and n is an integer of 1 to 6, b) at least one organic carboxylic acid selected from monobasic or polybasic, saturated or mono- or polyunsaturated carboxylic acids containing 2 to 22 carbon atoms, c) optionally water and additives and/or auxiliaries.

WO 94/03562 describes a lubricant concentrate based on fatty amines and optionally typical diluents or auxiliaries and additives, characterized in that it contains at least one polyamine derivative of a fatty amine and/or a salt of such an amine, the percentage content of the polyamine derivatives of fatty amines in the formulation as a whole being from 1 to 100% by weight.

In one preferred embodiment of WO 94/03562, this lubricant concentrate contains at least one polyamine derivative of a fatty amine corresponding to the following general formula:

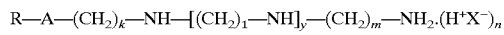

in which

R is a substituted or unsubstituted, linear or branched, saturated or mono- or polyunsaturated alkyl group containing 6 to 22 carbon atoms, the substituents being selected from amino, imino, hydroxy, halogen and carboxy, or a substituted or unsubstituted phenyl group, the substituents being selected from amino, imino, hydroxy, halogen, carboxy and a linear or branched, saturated or mono- or polyunsaturated alkyl group containing 6 to 22 carbon atoms, A represents either —NH— or —O—, X$^-$ is an anion of an inorganic or organic acid, k, l and m independently of one another are integers of 1 to 6, y is 0, 1, 2 or 3 where A=—NH— or 1, 2, 3 or 4 where A=—O— and n is an integer of 0 to 6.

Lubricants based on polytetrafluoroethylene are used in some bottling plants. They are present in the form of dispersions and are not applied to the chains in the usual way through nozzles, but instead by brushes. These lubricants have the advantage that they significantly reduce the friction between the conveyor belts and the containers transported thereon. In addition, the polytetrafluoroethylene adheres very strongly to the chains. A disadvantage encountered in practice was that the overall hygienic state in regard to germ population and soiling of the chain conveyors was adversely affected to such an extent that the performance profile of the lubricant gradually deteriorated as a result of the increase in soiling.

Another disadvantage encountered was that the dispersions of polytetrafluoroethylene were not stable in storage and gradually separated. The result of this is that, over a prolonged period, varying amounts of active substance are applied to the chain conveyors.

When an attempt was made to clean the chain conveyors, it was found that the layer of lubricant was very difficult to remove from the chains.

The problem addressed by the present invention was to provide a process for reducing the friction between new and/or freshly washed transport containers and conveyors in which the conveyor installation would not have to be equipped with additional fittings, such as metering units for example, to apply lubricant to the conveyor.

Another problem addressed by the invention was to provide containers finished in such a way that they would contribute towards reducing the friction between transport containers and conveyors.

A further problem addressed by the invention was to provide conveyor installations suitable for conveying correspondingly finished containers.

The present invention relates to a process for reducing the friction between new and/or freshly washed transport containers and conveyors, characterized in that a composition which contains at least one component with lubricating properties and which preferably forms a film or a coating on the surface of the transport container at individual places or all over is applied to at least part of the surface of the container before it is placed on the conveyor. In one particularly preferred embodiment, at least two different compositions are applied one above the other to at least part of the surface of the transport container.

In another preferred embodiment, first a film or a coating with excellent adhesion and anchoring properties and then a composition with excellent lubricating properties are successively applied to plastic bottles.

The compositions used in the process according to the invention contain components with lubricating properties which may be selected from any chemical compounds with lubricating properties and are preferably selected from compounds for which the lubricating property has already been described in the field of chain lubricants and more preferably from the groups of alkyl and alkoxy amines, soaps, imidazole derivatives, amphoteric surfactants, polysiloxanes, polyhydroxy compounds, perfluorinated or partly fluorinated organic compounds, phosphoric acid ester compounds, nonionic surfactants, complexing agents.

Where the composition used in the process according to the invention contains perfluorinated and/or partly fluorinated organic compounds as its lubricating component, these compounds preferably contain tetrafluoroalkylene as a structural element in their molecular structure.

The composition used in the process according to the invention preferably contains polysiloxanes as its lubricating component.

In another preferred embodiment, the composition used in the process according to the invention additionally contains at least one antimicrobial component selected from the groups of alcohols, aldehydes, antimicrobial acids, carboxylic acid esters, acid amides, phenols, phenol derivatives, diphenyls, diphenylalkanes, urea derivatives, oxygen and nitrogen acetals and formals, benzamidines, isothiazolines, phthalimide derivatives, pyridine derivatives, antimicrobial surface-active compounds, guanidines, antimicrobial amphoteric compounds, quinolines, 1,2-dibromo-2,4-dicyanobutane, iodo-2-propynyl butyl carbamate, iodine, iodophores, peroxides.

The composition used in the process according to the invention is preferably a solution, gel, emulsion, paste or dispersion and is applied to the transport container using an aid selected from paint brushes, sponges, rollers, cloths, brushes, wipers, rubber blades and spray nozzles. In a particularly preferred embodiment, the composition is diluted before application to the transport container.

In another preferred embodiment, the composition used in the process according to the invention is only applied to that part of the container which comes into contact with the conveyor during the conveying process. For PET beverage bottles with a champagne-type base for example, this means that only the annular bottom surface is finished with a film or a coating. In the case of PET beverage bottles which have several, often 5, points on which to stand, a film or a coating is only applied to those parts of the base.

It is irrelevant to the process whether the composition is applied before production of the container (in the case of PET bottles, for example, to the blank before the "blowing/stretching process"), during the production process or after production of the container. Since some bottling plants manufacture their own containers, the composition may be applied both in the bottling plant and in the factory of a supplier.

The expert on containers of the type in question will be able, on the strength of his knowledge of the production and use of such containers and/or on the basis of small-scale tests, to decide on the details for applying the composition forming the film or coating.

In one preferred embodiment of the present invention, the transport containers are glass bottles. In another preferred embodiment, the transport containers are plastic bottles and, in a particularly preferred variant, contain at least one polymer selected from the groups of polyethylene terephthalates (PET), polyethylene naphthenates (PEN), polycarbonates (PC), PVC. In one most particularly preferred embodiment, the plastic bottles are PET beverage bottles.

In another preferred embodiment, the transport containers are box packs made of paperboard although they may also be beverage cans.

In a particularly preferred embodiment, the transport containers belong to the group of non-returnable containers.

In addition, it is preferred for the process according to the invention if the carrying surfaces of the conveyor belts are made of plastic, preferably polyacetal or polyethylene. In another preferred embodiment, the carrying surfaces of the conveyor belt are made of metal, preferably stainless steel.

The process according to the invention is preferably used for reducing friction during the conveying of containers in the food industry.

The present invention also relates to containers of which at least part of the outer surface is finished with a film or a coating which contains lubricating components—the components with lubricating properties preferably being selected from compounds for which the lubricating property has already been described in the field of chain lubricants and more preferably from the groups of alkyl and alkoxy amines, soaps, imidazole derivatives, amphoteric surfactants, polysiloxanes, polyhydroxy compounds, perfluorinated or partly fluorinated organic compounds, phosphoric acid ester compounds, nonionic surfactants, complexing agents—and of which the effect is that less friction is produced between containers and conveyors during the conveying process than in the conveying of containers which have no comparable film or coating on their outer surface.

So far as the choice of the lubricating components is concerned, it is expressly pointed out that there is a clear difference between these components and the release or parting agents which are applied for a totally different purpose.

In one preferred embodiment, the film or coating additionally contains at least one antimicrobial component selected from the groups of alcohols, aldehydes, antimicrobial acids, carboxylic acid esters, acid amides, phenols, phenol derivatives, diphenyls, diphenylalkanes, urea derivatives, oxygen and nitrogen acetals and formals, benzamidines, isothiazolines, phthalimide derivatives, pyridine derivatives, antimicrobial surface-active compounds, guanidines, antimicrobial amphoteric compounds, quinolines, 1,2-dibromo-2,4-dicyanobutane, iodo-2-propynyl butyl carbamate, iodine, iodophores, peroxides.

In another preferred embodiment at least two films and/or coating containing different components are applied one above the other to at least part of the surface of the container. In a particularly preferred variant, first a film or a coating with adhesive and anchoring properties and then a composition with lubricating properties are applied to the surface of the container.

The containers according to the invention preferably belong to the group of non-returnable containers and, in a particularly preferred embodiment, are plastic bottles which preferably contain at least one polymer selected from the groups of polyethylene terephthalates (PET), polyethylene naphthenates (PEN), polycarbonates (PC), PVC. In one most particularly preferred embodiment, the plastic bottles are PET beverage bottles.

In another preferred embodiment, the containers according to the invention may be beverage cans, paperboard boxes or glass bottles.

The present invention also relates to conveyor installations for the food industry which, through the use of the containers according to the invention and/or the process according to the invention, are of a more compact construction than conveyor installations which are not designed for containers according to the invention and/or the process according to the invention.

In particular, where the conveyor installations according to the invention are used, there is no longer any need to apply lubricant to the conveyor installations in the bottling plant. Accordingly, there is no need to equip the conveyor installations according to the invention with expensive fittings, such as applicators for lubricants, for example in the form of metering units, and additional peripherals, such as pipes and pumps. In addition, there is no longer any need at the bottling plant for the elaborate measures involved in the storage of the corresponding chemicals.

The present invention affords a number of advantages such as, for example, reduction of the equipment needed at the bottling plant. At the same time, the handling of chemicals at the bottling plant can be considerably reduced. By virtue of the targeted application of the lubricant, it goes directly to where it is needed and is not spread over all parts of the installation as in the past. Another advantage is that no foam is formed during the conveying process.

EXAMPLE

In a first test, a known lubricating formulation consisting of 5% by weight of perfluoropolyether and 95% by weight of glycerol is applied by cloth to the bottom ring of a non-returnable PET bottle. It is possible by differential weighing to establish that 2 mg of the lubricant adheres to the PET bottle.

According to the present invention, the friction coefficient between the non-returnable PET bottle thus treated and the conveyor chains is defined as the ratio of the tractive weight applied, for example, to a spring balance when an attempt is made to hold a bottle still while the conveyor is moving to the weight of that bottle, no additional lubricant being applied to the conveyor chains.

In this first test, the friction coefficient p varied between 0.06 and 0.1 for stainless steel chains and between 0.04 and 0.08 for plastic chains.

In the comparison test, the friction coefficient between an untreated non-returnable PET bottle taken from the same production batch as the non-returnable PET bottle used in the first test and the conveyor chains is similarly determined. In this comparison test, the friction coefficient $\mu$ was >0.15 for plastic chains. When the test was carried out on stainless steel chains, all the bottles fell over.

What is claimed is:

1. A process for reducing the friction between new and/or freshly washed transport containers and conveyors, the process comprising applying a composition which contains at least one component with lubricating properties to at least part of the surface of the container before the container is placed on the conveyor, wherein the composition which contains at least one component with lubricating properties comprises at least one compound selected from the groups of alkyl and alkoxy amines, soaps, imidazole derivatives, amphoteric surfactants, polysiloxanes, polyhydroxy compounds, perfluorinated or partly fluorinated organic compounds, phosphoric acid ester compounds, nonionic surfactants, and complexing agents.

2. A process as claimed in claim 1, wherein the composition applied forms a film or a coating on the surface of the transport container at certain places or all over.

3. A process as claimed in claim 1, wherein at least two different compositions are applied one above the other to at least part of the surface of the transport container.

4. A process as claimed in claim 1, wherein the compositions applied contain perfluorinated and/or partly fluorinated organic compounds which contain tetrafluoroethylene as a structural element in their molecular structure.

5. A process as claimed in claim 1, wherein polysiloxanes are present in the compositions applied.

6. A process as claimed in claim 1, wherein the compositions applied additionally contain at least one antimicrobial component selected from the groups of alcohols, aldehydes, antimicrobial acids, carboxylic acid esters, acid amides, phenols, phenol derivatives, diphenyls, diphenylalkanes, urea derivatives, oxygen and nitrogen acetals and formals, benzamidines, isothiazolines, phthalimide derivatives, pyridine derivatives, antimicrobial surface-active compounds, guanidines, antimicrobial amphoteric compounds, quinolines, 1,2-dibromo-2,4-dicyanobutane, iodo-2-propynyl butyl carbamate, iodine, iodophores, peroxides.

7. A process as claimed in claim 1, wherein the compositions are applied in the form of a solution, gel, emulsion, paste or dispersion.

8. A process as claimed in claim 1, wherein the compositions are applied to the transport container using an aid selected from paint brushes, sponges, rollers, cloths, brushes, wipers, rubber blades and spray nozzles.

9. A process as claimed in claim 1, wherein the compositions are diluted before application to the transport container.

10. A process as claimed in claim 1, wherein the compositions are only applied to that part of the container which comes into contact with the conveyor during the conveying process.

11. A process as claimed in claim 1, wherein the transport containers are glass bottles.

12. A process as claimed in claim 1, wherein the transport containers are plastic bottles.

13. A process as claimed in claim 12, wherein the plastic bottles contain at least one polymer selected from the groups of polyethylene terephthalates (PET), polyethylene naphthenates (PEN), polycarbonates (PC), PVC.

14. A process as claimed in claim 13, wherein the plastic bottles are PET beverage bottles.

15. A process as claimed in claim 1, wherein the transport containers are paperboard box packs.

16. A process as claimed in claim 1, where the transport containers are beverage cans.

17. A process as claimed in claim 1, wherein the transport containers are non-returnable containers.

18. A process as claimed in claim 1, wherein the carrying surfaces of the conveyor are made of plastic.

19. A process as claimed in claim 1, wherein the carrying surfaces of the conveyor are made of metal.

20. A process as claimed in claim 1 for conveying containers in the food industry.

* * * * *